United States Patent
Tumey et al.

(10) Patent No.: US 7,039,221 B1
(45) Date of Patent: May 2, 2006

(54) FACIAL IMAGE VERIFICATION UTILIZING SMART-CARD WITH INTEGRATED VIDEO CAMERA

(76) Inventors: David M. Tumey, 5018 Newcastle La., San Antonio, TX (US) 78249; Tianning Xu, 400 W. Betters Rd., Apt. 809, San Antonio, TX (US) 78216; Craig M. Arndt, 4170 Rosewood Ave., Valkaria, FL (US) 32950

( * ) Notice: Subject to any disclaimer, the term of this patent is extended or adjusted under 35 U.S.C. 154(b) by 0 days.

(21) Appl. No.: 09/545,336

(22) Filed: Apr. 7, 2000

Related U.S. Application Data (60) Provisional application No. 60/128,566, filed on Apr. 9, 1999.

(51) Int. Cl.
*G06K 9/00* (2006.01)

(52) U.S. Cl. .................................... 382/118
(58) Field of Classification Search ............ 902/25–26; 235/379–382.5; 382/115–127
See application file for complete search history.

(56) References Cited

U.S. PATENT DOCUMENTS

| | | |
|---|---|---|
| 3,805,238 A | 4/1974 | Rothfjell |
| 4,202,120 A | 5/1980 | Engel |
| 4,213,038 A | 7/1980 | Silverman et al. |
| 4,338,025 A | 7/1982 | Engle |
| 4,449,189 A | 5/1984 | Feix et al. |
| 4,712,103 A | 12/1987 | Gotanda |
| 4,811,408 A | 3/1989 | Goldman |
| 4,904,851 A | 2/1990 | Yukino |
| 4,972,476 A | 11/1990 | Nathanks |
| 4,975,969 A | 12/1990 | Tal |
| 4,993,068 A | 2/1991 | Piosenka et al. |
| 5,031,228 A | 7/1991 | Lu |
| 5,144,680 A | 9/1992 | Kobayashi et al. |

(Continued)

FOREIGN PATENT DOCUMENTS

EP 705037 A2 * 4/1996

(Continued)

OTHER PUBLICATIONS

Pain et al., A low-power digital camera-on-a-chip implemented in CMOS active pixel approach, Jan. 1999, VLSI Design, 1999. Proceedings. Twelfth International Conference On, 1999. pp.: 26-31.*

(Continued)

*Primary Examiner*—Joseph Mancuso
*Assistant Examiner*—Craig Kronenthal
(74) *Attorney, Agent, or Firm*—Eric W. Cernyar (57) ABSTRACT

A biometric facial image verification system capable of recognizing human users which includes a smart-card having stored thereon encoded first human facial images, a video camera and video digitizer embedded within said smart-card for acquiring data representative of a second human facial image. A computer-based device with a docking station capable of receiving said smart-card and software resident within said computer-based device for facial recognition, which includes Principal Component Analysis, Neural Networks, or another equivalent algorithm for comparing said first human facial images with said second human facial image and producing an output signal therefrom for use in verifying the identity of said human users. The apparatus can further include software for fingerprint and speech recognition. In addition, said smart-card is capable of acquiring and storing information pertaining to each of said human users such as would be required for use in a high-security environment or preventing fraud in point of sale and Internet-based financial transactions.

14 Claims, 6 Drawing Sheets

U.S. PATENT DOCUMENTS

| | | | |
|---|---|---|---|
| 5,164,992 A | 11/1992 | Turk et al. | |
| 5,180,901 A * | 1/1993 | Hiramatsu | 235/380 |
| 5,280,527 A | 1/1994 | Gullman et al. | |
| 5,386,103 A | 1/1995 | Deban et al. | |
| 5,432,864 A | 7/1995 | Lu et al. | |
| 5,457,747 A | 10/1995 | Drexler et al. | |
| 5,469,506 A | 11/1995 | Berson et al. | |
| 5,509,083 A | 4/1996 | Abtahi et al. | |
| 5,526,428 A | 6/1996 | Arnold | |
| 5,566,327 A | 10/1996 | Sehr | |
| 5,623,552 A | 4/1997 | Lane | |
| 5,668,874 A | 9/1997 | Kristol et al. | |
| 5,799,092 A | 8/1998 | Kristol et al. | |
| 5,802,199 A * | 9/1998 | Pare et al. | 382/115 |
| 5,917,545 A * | 6/1999 | Kowno et al. | 348/231.9 |
| 5,987,155 A * | 11/1999 | Dunn et al. | 382/116 |
| 5,991,468 A * | 11/1999 | Murakami et al. | 382/313 |
| 6,038,333 A * | 3/2000 | Wang | 382/118 |
| 6,118,485 A * | 9/2000 | Hinoue et al. | 348/373 |
| 6,137,685 A * | 10/2000 | Morinaga | 361/727 |
| 6,256,063 B1 * | 7/2001 | Saito et al. | 348/231.99 |
| 6,385,318 B1 * | 5/2002 | Oishi | 380/262 |

FOREIGN PATENT DOCUMENTS

| | | |
|---|---|---|
| EP | 758776 A2 * | 2/1997 |
| GB | 2289555 A * | 11/1995 |
| JP | 04156185 A * | 5/1992 |

OTHER PUBLICATIONS

Lippman, Richard P., "Introduction to Commputing with Neural Networks," IEEE, ASSP Magazine, Apr. 1987, pp. 4-22.

* cited by examiner

FACIAL IMAGE VERIFICATION UTILIZING SMART-CARD WITH INTEGRATED VIDEO CAMERA

This Application claims the benefit of U.S. Provisional patent application Ser. No. 60/128,566 filed Apr. 9, 1999.

FIELD OF THE INVENTION

The present invention is generally directed to an apparatus and method for identifying a human user utilizing automated facial image recognition. More particularly, the invention includes a video camera embedded within a smart-card and a computer-based algorithm capable of verifying the face of a human user by comparing a live image with one or more reference images stored on said smart-card, and providing a response signal therefrom either of recognition or non-recognition of said human user. In addition, said smart-card can store in resident memory, specific information about said human user and further access and recall said information for use in applications requiring a high degree of security.

BACKGROUND OF THE INVENTION

Facility security and more particularly security for facilities with free public access has always been of paramount importance to government, corporations and individuals alike. Theft, burglary, industrial espionage and an increasingly sophisticated criminal environment have made securing facilities far more difficult than at any other time in history. Law enforcement officials find themselves overwhelmed and unable to protect the average citizen from the ever increasing incidence of criminal activity. It is becoming apparent that traditional security devices such as alarms, keys, touch-pads with personal identification numbers (PIN), magnetic card readers, ID cards with two-dimensional bar-codes, radio frequency ID tags and other conventional technologies are becoming less effective in preventing access to facilities by unauthorized personnel. The problem is costing insurance companies, businesses and U.S. citizens, billions of dollars each year. In addition, many burglaries are responsible for the loss of life of many hapless victims who were attempting to protect their property. In recent years, corporations and private individuals have attempted to answer this daunting challenge by introducing a number of improved security upgrades, such as advanced smart-cards, sophisticated networked alarm systems, video surveillance and biometric identification techniques (recognizing an individual based on a physiological metric), however, although very promising, biometric security systems have yet to be broadly commercialized either due to their complexity, invasiveness or high cost.

There exists many methods for controlling access to secure facilities as described in detail herein above. Similarly there exists many methods for the biometric identification of humans which includes fingerprint pattern matching, voice recognition, iris scanning, retina imaging as well as facial image verification.

Iris and retina identification systems are considered "invasive", expensive and not practical for applications where limited computer memory storage is available. Voice recognition is somewhat less invasive, however it is cost prohibitive and can require excessive memory storage space for the various voice "templates" and sophisticated recognition algorithms. In addition, identification processing delays can be excessive and unacceptable for many applications.

Fingerprint recognition systems, although highly accurate, are a cause of concern for many individuals due to the fact the "taking" of fingerprints is generally associated with some type of criminal activity. Fingerprints are typically associated with law enforcement and therefore have a societal stigma attached to them which makes the fingerprint biometric less desirable for general security applications. Fingerprint recognition systems therefore could meet significant resistance from the general public preventing widespread use.

Face recognition is a minimally invasive biometric technique capable of positively identifying an authorized individual. A face verification system utilizing a video camera and associated digitizer electronics can be embedded directly into a smart-card and can be constructed in such a way that its use is transparent to the user. With recent advancements in the speed of microprocessors and a notable increase in the memory capacity of inexpensive smart-cards, it has become possible to implement a practical and cost effective facial image verification system for use in providing access control to secure facilities. In addition, the present invention can also be utilized for myriad other security applications such as preventing fraud in point of sale and Internet-based financial transactions.

The prior references are abundant with biometric verification systems that have attempted to identify an individual based on a whole or partial digitized facial image. A major problem that has been recognized implicitly or explicitly by many prior reference inventors is that of securing adequate memory capacity for storing an encoded representation of a person's face on a medium that is compact and inexpensive such as a smart-card. Because of this and other limitations, none of the prior references provide suitable means for use with the present invention. Notable among the prior reference patents pertaining to facial image recognition:

U.S. Pat. No. 3,805,238, wherein Rothfjell teaches an identification system in which major features (e.g. the shape of a person's nose in profile) are extracted from an image and stored. The stored features are subsequently retrieved and overlaid on a current image of the person to verify identity.

U.S. Pat. No. 4,712,103, wherein Gotanda teaches, inter alia, storing a digitized facial image in a non-volatile ROM on a key, and retrieving that image for comparison with a current image of the person at the time he/she request access to a secured area. Gotanda describes the use of image compression, by as much as a factor of four, to reduce the amount of data storage capacity needed by the ROM that is located on the key.

U.S. Pat. No. 4,858,000 wherein Lu teaches an image recognition system and method for identifying ones of a predetermined set of individuals, each of whom has a digital representation of his or her face stored in a defined memory space.

U.S. Pat. No. 4,975,969, wherein Tal teaches an image recognition system and method in which ratios of facial parameters (which Tal defines a distances between definable points on facial features such as a nose, mouth, eyebrow etc.) are measured from a facial image and are used to characterize the individual. Tal, like Lu in U.S. Pat. No. 4,858,000, uses a binary image to find facial features.

U.S. Pat. No. 5,031,228, wherein Lu teaches an image recognition system and method for identifying ones of a predetermined set of individuals, each of whom has a digital representation of his or her face stored in a defined memory space. Face identification data for each of the predetermined individuals are also stored in a Universal Face Model block that includes all the individual pattern images or face signatures stored within the individual face library.

U.S. Pat. No. 5,053,603, wherein Burt teaches an image recognition system using differences in facial features to distinguish one individual from another. Burt's system uniquely identifies individuals whose facial images and selected facial feature images have been learned by the system. Burt's system also "generically recognizes" humans and thus distinguishes between unknown humans and non-human objects by using a generic body shape template.

U.S. Pat. No. 5,164,992 wherein Turk and Pentland teach the use of an Eigenface methodology for recognizing and identifying members of a television viewing audience. The Turk et al system is designed to observe a group of people and identify each of the persons in the group to enable demographics to be incorporated in television ratings determinations.

U.S. Pat. No. 5,386,103, wherein Deban et al teach the use of an Eigenface methodology for encoding a reference face and storing said reference face on a card or the like, then retrieving said reference face and reconstructing it or automatically verifying it by comparing it to a second face acquired at the point of verification. Deban et al teach the use of this system in providing security for Automatic Teller Machine (ATM) transactions, check cashing, credit card security and secure facility access.

U.S. Pat. No. 5,432,864, wherein Lu et al teach the use of an Eigenface methodology for encoding a human facial image and storing it on an "escort memory" for later retrieval or automatic verification. Lu et al teach a method and apparatus for employing human facial image verification for financial transactions.

Although many inventors have offered myriad approaches attempting to providing inexpensive, minimally invasive, and compact facial image verification systems in which digitized faces of human users could be stored, retrieved and compared at some later time to verify that a human user is indeed a properly authorized user, none have succeeded in producing a system that is practical and desirable for use in providing non-invasive biometric security for appropriate for use with a smart-card. Because of these and other significant limitations, no commercially viable biometric-based smart-card security system has been successfully marketed.

The present invention overcomes all of the aforesaid limitations by combining new inexpensive single integrated circuit video cameras utilizing minimal optics, with streamlined verification algorithms and advanced microprocessor architectures. The most novel aspect of the present invention, which provides biometric verification completely transparent to the user, is the integration of the video camera and associated digitizer directly into a smart-card. The video camera is embedded in the smart-card's plastic enclosure and arranged so as to provide a good quality facial image of a human user when the card is inserted into a properly designed docking station. Thus a digitized facial image can be acquired during routine use of the present invention without requiring an attentive action by the human user and is therefore minimally invasive. In addition, the algorithms of the present invention have been optimized to allow the storage of digitized facial images directly within the smart-card itself, thus the database for each human user is maintained within each individual smart-card.

Another unique feature of the present invention that helps to overcome the storage limitations of most smart-cards is the automatic removal of facial images that are no longer utilized by the system for recognition of the human user. For example, if a particular reference facial image stored on the card is never utilized for verification, after a predetermined time limit, the facial image would automatically be removed from the system thus freeing up storage space for newer images or other essential data.

SUMMARY OF THE INVENTION

It is an object of the present invention to improve the apparatus and method for verifying the identity of human users for use in providing security for facilities and preventing fraud in point of sale and Internet-based financial transactions.

It is another object of the present invention to improve the apparatus and method for integrating facial image verification with smart-card technology to create a minimally invasive biometric system.

In accordance with the foregoing objects, the present invention is generally directed to an apparatus for a biometric facial image verification system capable of recognizing human users which includes a smart-card having stored thereon encoded first human facial images, a video camera and video digitizer embedded within said smart-card for acquiring data representative of a second human facial image. A computer-based device with a docking station capable of receiving said smart-card and software resident within said computer-based device for facial recognition, which includes Principal Component Analysis, Neural Networks, or another equivalent algorithm for comparing said first human facial images with said second human facial image and producing an output signal therefrom for use in verifying the identity of said human users. The apparatus can further include software for fingerprint and speech recognition. In addition, said smart-card is capable of acquiring and storing information pertaining to each of said human users such as would be required for use in a high-security environment or preventing fraud in point of sale and Internet-based financial transactions.

Other objects and advantages will be readily apparent to those of ordinary skill in the art upon viewing the drawings and reading the detailed description hereafter.

DETAILED DESCRIPTION OF THE PREFERRED EMBODIMENT

Figure 1:
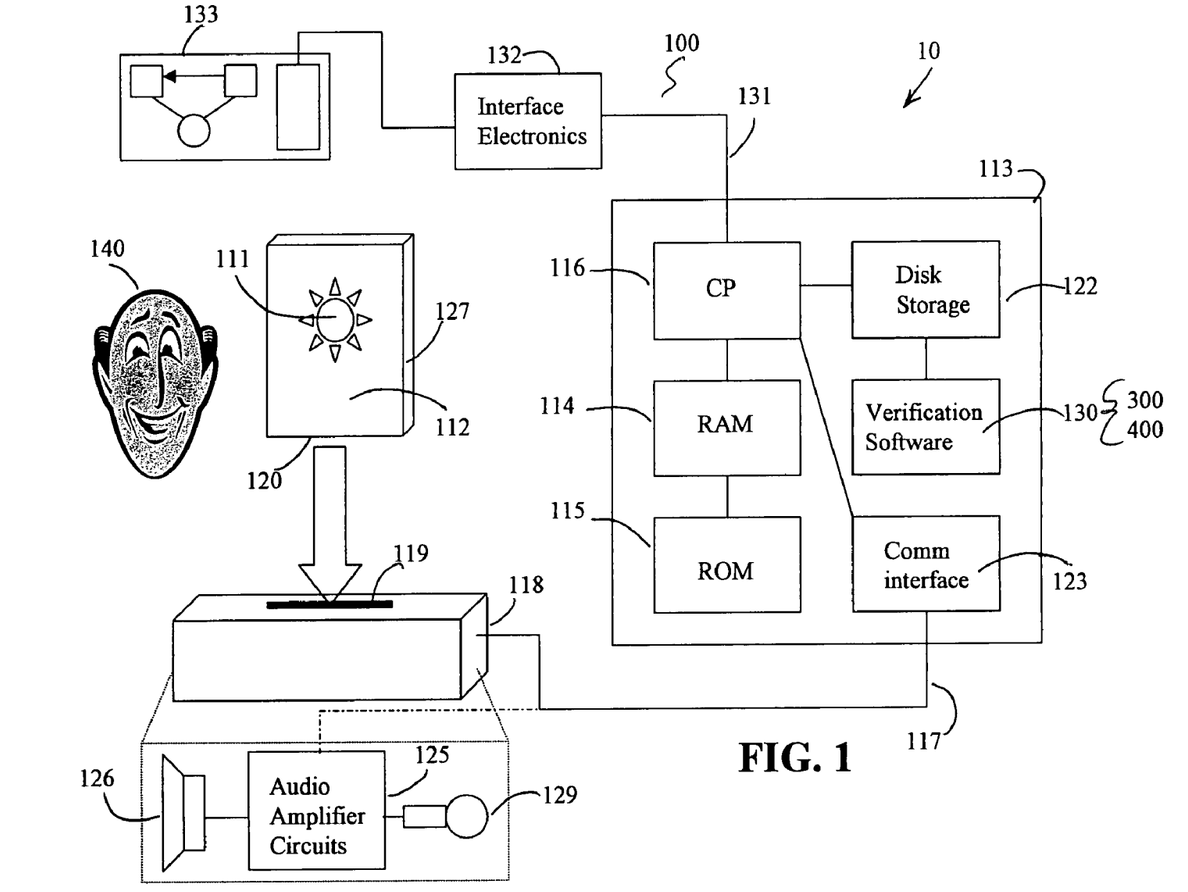
FIG. 1 shows a block diagram of one aspect of the present invention for controlling access to secure facilities.

Referring to the drawings, an apparatus for a smart-card with embedded video camera capable of providing biometric verification of human users 140 of the present invention is generally referred to by the numeral 10. Referring to FIG. 1, an apparatus for preventing access to secure areas 100 of the present invention 10, includes a computer 113 having a central processor (CP) 116 which can be of a type that is well known in the art and commercially available under such trademarks as Intel® 486 or Pentium®, conventional non-volatile Random Access Memory (RAM) 114, conventional Read Only Memory (ROM) 115, and disk storage device 122. Computer 113 can be configured as a standard PC, or can be implemented as a custom single-board computer utilizing an embedded operating system such as is sold commercially under the trademark Windows NT®. Computer 113 is further operably associated with communications interface 123, communications cable 117 and smart-card docking station 118. Docking station 118 has electrical contacts 119 associated therewith for mating with similarly disposed electrical contacts 120 which are enclosed in smart-card 127 and further permit the transfer of communication signals therethrough when smart-card 127, which is removably associated with docking station 118, is placed into docking station 118. A video camera 111, and video digitizer 112 are additionally embedded within the smart-card 127. The communication signals which are passed therethrough include digitized or baseband video signals from embedded video camera 111, and information to be stored or retrieved from smart-card's 127 internal non-volatile RAM. The video camera 111, which is well known in the art and is commercially available under such trademarks as ProVideo™, can be a standard inexpensive Charge Coupled Device (CCD), while digitizer 112 can also be one of myriad miniature integrated circuits which are known to anyone of ordinary skill in the art. The computer 113 has operably associated therewith a face recognition software engine 130 which can be one of a Neural Network 300 or Principal Component Analysis (PCA) 400 or equivalent algorithm, the particulars of which are further described hereinafter.

An additional communications cable 131 is likewise associated with the computer 113 and operably connected to interface electronics 132 for providing communications and control signals to secure access actuation device 133. Secure access actuation device 133 can be one of many forms typically found in most modern facility installations including electrically activated door strike plates or sophisticated card or PIN based systems. Interface electronics 132 is responsible for communicating signals of recognition and non-recognition of human user 140 to actuation device 133 and as such enable or disable the activation of the facility security system or door locking mechanism. When a human user 140 desires access to a secure area or secure facility, human user 140 would insert smart-card 127 into docking station 118 located at or near the point of entry. The face recognition element 130 would then compare facial images of human user 140 acquired by video camera 111 with those stored in the non-volatile RAM memory of smart-card 127. If the facial image of human 140 is verified, a signal indicative of recognition is communicated via communications cable 131 to interface electronics 132 which would instruct activation of the actuation device 133. In the event the facial image of human user 140 was not verified, a signal indicative of non-recognition is provided to interface electronics 132 and secure access actuation device 133 would remain locked.

In addition to the communications and control functions, an audio amplifier 125 speaker 126, and microphone 129 can be optionally associated with docking station 118 to enable the system 100 to recognize speech, and provide synthesized vocal instructions to the human user 140 as part of its security function.

Figure 2:
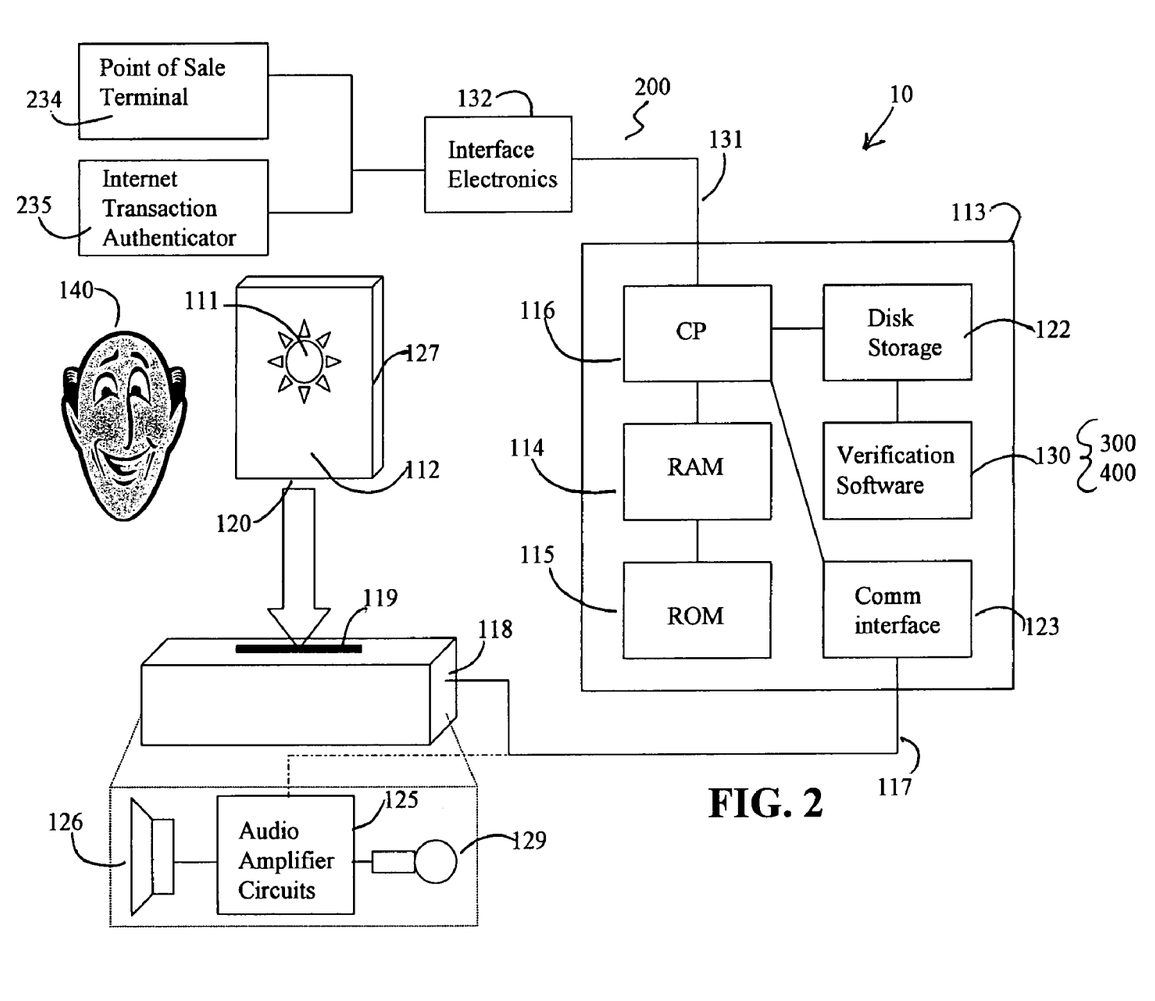
FIG. 2 shows a block diagram of another aspect of the present invention for preventing fraud in point of sale and Internet-based financial transactions.

Referring now to FIG. 2, another embodiment for an apparatus directed to the prevention of fraud in point of sale and Internet-based financial transactions, generally referred to by the numeral 200 of the present invention 10, includes a computer 113 having a central processor (CP) 116 (e.g. Intel® 486 or Pentium®), conventional non-volatile Random Access Memory (RAM) 114, conventional Read Only Memory (ROM) 115 and disk storage device 122. Computer 113 can be configured as a standard PC, or can be implemented as a custom single-board computer utilizing an embedded operating system such as is sold commercially under the trademark Windows NT®. Computer 113 is further operably associated with communications interface 123, communications cable 117 and smart-card docking station 118. Docking station 118 has electrical contacts 119 associated therewith for mating with similarly disposed electrical contacts 120 which are enclosed in smart-card 127 and further permit the transfer of communication signals when smart-card 127, which is removably associated with docking station 118, is placed into docking station 118. A video camera 111, and video digitizer 112 are additionally embedded within the smart-card 127. The communication signals which are passed therethrough include digitized or baseband video signals from embedded video camera 111, and information to be stored or retrieved from smart-card's 127 internal non-volatile RAM. The video camera 111, which is well known in the art and is commercially available under such trademarks as ProVideo™, can be a standard inexpensive Charge Coupled Device (CCD), while digitizer 112 can also be one of myriad miniature integrated circuits which are known to anyone of ordinary skill in the art. The computer 113 has operably associated therewith a face recognition software engine 130 which can be one of a Neural Network 300 or Principal Component Analysis (PCA) 400 or equivalent algorithm, the particulars of which are further described hereinafter.

An additional communications cable 131 is likewise associated with the computer 113 and operably connected to interface electronics 132 for providing communications and control signals to a point of sale terminal 234 or Internet transaction authenticator 235. Interface electronics 132 is responsible for communicating to point of sale terminal 234 or Internet transaction authenticator 235 a signal indicative of recognition or non-recognition of a human user 140 prior to completing a financial transaction. With the point of sale terminal 234, a human user 140 would insert a smart-card 127 into a docking station 118 located at the point of sale terminal 234. Facial image verification, as described in further detail herein below would either enable or disable the financial transaction depending on whether or not the human user's 140 facial image matches one of those which are stored on smart-card's 127 internal non-volatile RAM memory. For Internet-based financial transactions, the process of biometric verification is essentially identical as for that of the point of sale terminal. Human user 140, who wishes to complete a financial transaction via the Internet, would insert a smart-card 127 into a docking station 118 which would then provide biometric verification via a software based Internet transaction authenticator 235 that in-turn would ensure the financial transaction was legitimate.

There are a variety of methods by which the recognition and identification element 130 of the present invention can be implemented. Both the facility access security apparatus 100, and the point of sale and Internet-based fraud prevention apparatus 200 of the present invention 10 can make use of a neural network 300 or PCA 400 or other equivalent facial image recognition algorithm to generate an output signal indicative of recognition or non-recognition of a human user 140.

Although the methods differ in computational structure, it is widely accepted by those of ordinary skill in the art that they are functionally equivalent. An example of two practical techniques, neural network 300 and PCA 400 are provided herein below and are depicted in FIG. 3 and FIG. 4 respectively.

Figure 3:
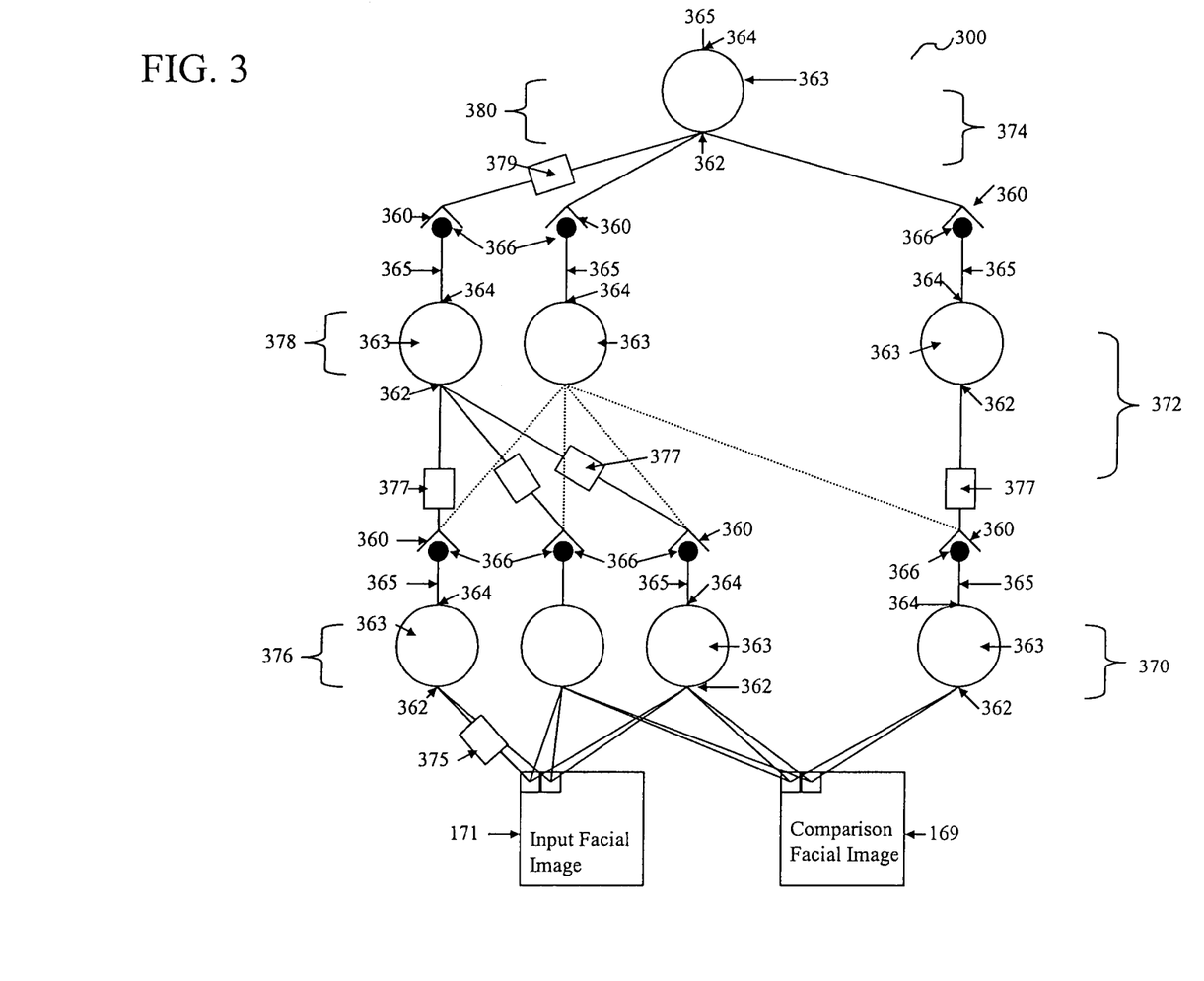
FIG. 3 shows a representation of a neural network of the present invention.
Figure 4:
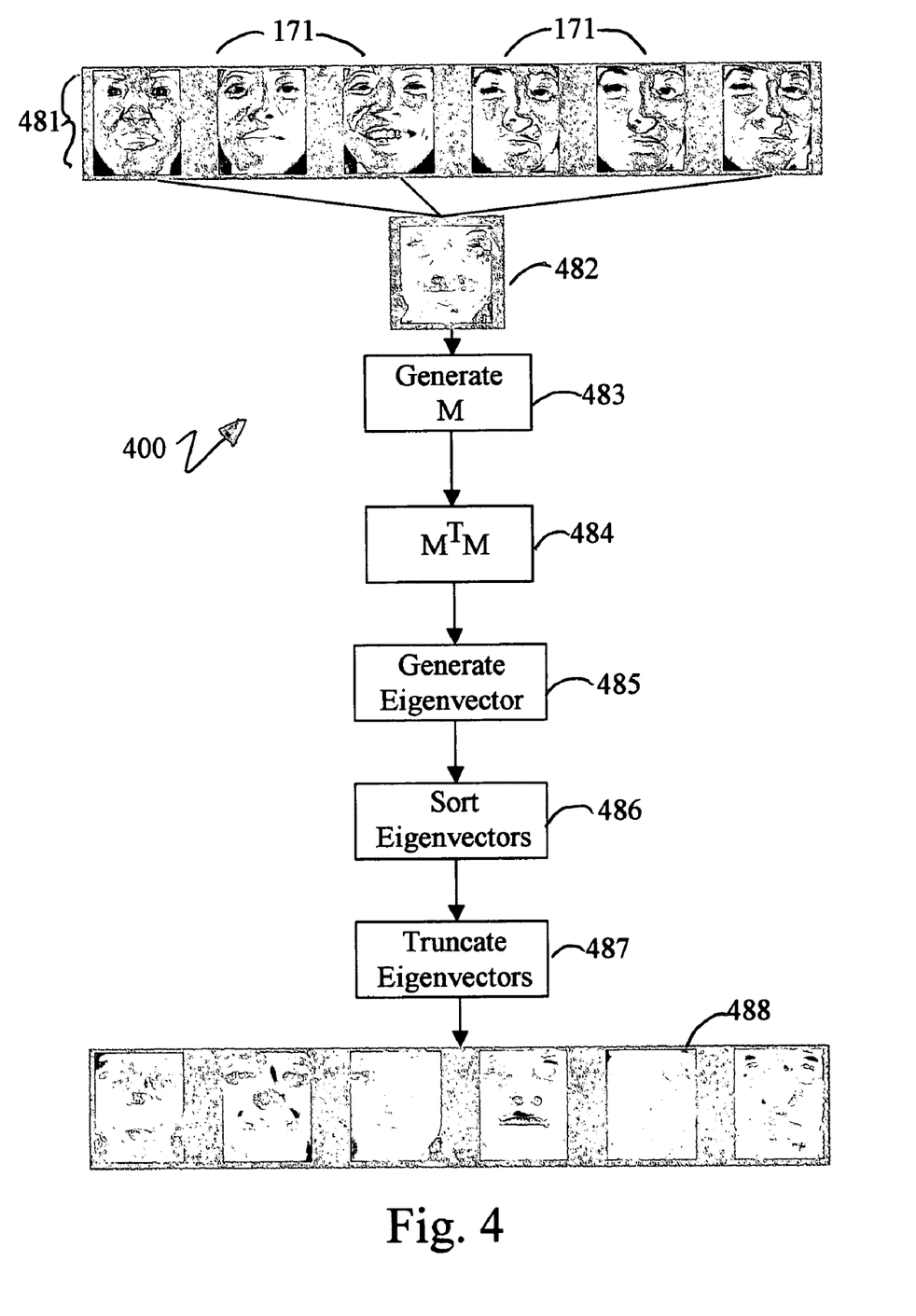
FIG. 4 shows a representation of a Principal Component Analysis (PCA) of the present invention.

As shown in FIG. 3, the neural network 300 includes at least one layer of trained neuron-like units, and preferably at least three layers. The neural network 300 includes input layer 370, hidden layer 372, and output layer 374. Each of the input layer 370, hidden layer 372, and output layer 374 include a plurality of trained neuron-like units 376, 378 and 380, respectively.

Neuron-like units 376 can be in the form of software or hardware. The neuron-like units 376 of the input layer 370 include a receiving channel for receiving human facial image data 171, and comparison facial image data 169 wherein the receiving channel includes a predetermined modulator 375 for modulating the signal.

The neuron-like units 378 of the hidden layer 372 are individually receptively connected to each of the units 376 of the input layer 370. Each connection includes a predetermined modulator 377 for modulating each connection between the input layer 370 and the hidden layer 372.

The neuron-like units 380 of the output layer 374 are individually receptively connected to each of the units 378 of the hidden layer 372. Each connection includes a predetermined modulator 379 for modulating each connection between the hidden layer 372 and the output layer 374. Each unit 380 of said output layer 374 includes an outgoing channel for transmitting the output signal.

Each neuron-like unit 376, 378, 380 includes a dendrite-like unit 360, and preferably several, for receiving incoming signals. Each dendrite-like unit 360 includes a particular modulator 375, 377, 379 which modulates the amount of weight which is to be given to the particular characteristic sensed as described below. In the dendrite-like unit 360, the modulator 375, 377, 379 modulates the incoming signal and subsequently transmits a modified signal 362. For software, the dendrite-like unit 360 comprises an input variable $X_a$ and a weight value $W_a$ wherein the connection strength is modified by multiplying the variables together. For hardware, the dendrite-like unit 360 can be a wire, optical or electrical transducer having a chemically, optically or electrically modified resistor therein.

Each neuron-like unit 376, 378, 380 includes a soma-like unit 363 which has a threshold barrier defined therein for the particular characteristic sensed. When the soma-like unit 363 receives the modified signal 362, this signal must overcome the threshold barrier whereupon a resulting signal is formed. The soma-like unit 363 combines all resulting signals 362 and equates the combination to an output signal 364 indicative of one of recognition or non-recognition of a human facial image.

For software, the soma-like unit 363 is represented by the sum $\alpha = \Sigma_a X_a W_a - \beta$, where $\beta$ is the threshold barrier. This sum is employed in a Nonlinear Transfer Function (NTF) as defined below. For hardware, the soma-like unit 363 includes a wire having a resistor; the wires terminating in a common point which feeds into an operational amplifier having a nonlinear component which can be a semiconductor, diode, or transistor.

The neuron-like unit 376, 378, 380 includes an axon-like unit 365 through which the output signal travels, and also includes at least one bouton-like unit 366, and preferably several, which receive the output signal from the axon-like unit 365. Bouton/dendrite linkages connect the input layer 370 to the hidden layer 372 and the hidden layer 372 to the output layer 374. For software, the axon-like unit 365 is a variable which is set equal to the value obtained through the NTF and the bouton-like unit 366 is a function which assigns such value to a dendrite-like unit 360 of the adjacent layer. For hardware, the axon-like unit 365 and bouton-like unit 366 can be a wire, an optical or electrical transmitter.

The modulators 375, 377, 379 which interconnect each of the layers of neurons 370, 372, 374 to their respective inputs determines the classification paradigm to be employed by the neural network 300. Human facial image data 171, and comparison facial image data 169 are provided as inputs to the neural network and the neural network then compares and generates an output signal in response thereto which is one of recognition or non-recognition of the human facial image.

It is not exactly understood what weight is to be given to characteristics which are modified by the modulators of the neural network, as these modulators are derived through a training process defined below.

The training process is the initial process which the neural network must undergo in order to obtain and assign appropriate weight values for each modulator. Initially, the modulators 375, 377, 379 and the threshold barrier are assigned small random non-zero values. The modulators can each be assigned the same value but the neural network's learning rate is best maximized if random values are chosen. Human facial image data 171 and comparison facial image data 169 are fed in parallel into the dendrite-like units of the input layer (one dendrite connecting to each pixel in facial image data 171 and 169) and the output observed.

The Nonlinear Transfer Function (NTF) employs $\alpha$ in the following equation to arrive at the output:

$$NTF = 1/[1+e^{-\alpha}]$$

For example, in order to determine the amount weight to be given to each modulator for any given human facial image, the NTF is employed as follows:

If the NTF approaches 1, the soma-like unit produces an output signal indicating recognition. If the NTF approaches 0, the soma-like unit produces an output signal indicating non-recognition.

If the output signal clearly conflicts with the known empirical output signal, an error occurs. The weight values of each modulator are adjusted using the following formulas so that the input data produces the desired empirical output signal.

For the Output Layer:

$W^*_{kol} = W_{kol} + GE_k Z_{kos}$ $W^*_{kol}$=new weight value for neuron-like unit k of the outer layer.

$W_{kol}$=current weight value for neuron-like unit k of the outer layer.

G=gain factor $Z_{kos}$=actual output signal of neuron-like unit k of output layer.

$D_{kos}$=desired output signal of neuron-like unit k of output layer.

$E_k = Z_{kos}(1-Z_{kos})(D_{kos}-Z_{kos})$, (this is an error term corresponding to neuron-like unit k of outer layer).

For the Hidden Layer:

$W^*_{jhl} = W_{jhl} + GE_j Y_{jos}$ $W^*_{jhl}$=new weight value for neuron-like unit j of the hidden layer.

$W_{jhl}$=current weight value for neuron-like unit j of the hidden layer.

G=gain factor $Y_{jos}$=actual output signal of neuron-like unit j of hidden layer.

$E_j = Y_{jos}(1-Y_{jos})\Sigma_k(E_{k*}W_{kol})$, (this is an error term corresponding to neuron-like unit j of hidden layer over all k units).

For the input layer:

$W^*_{iil} = W_{iil} + GE_i X_{ios}$ $W^*_{iil}$=new weight value for neuron-like unit I of input layer.

$W_{iil}$=current weight value for neuron-like unit I of input layer.

G=gain factor $X_{ios}$=actual output signal of neuron-like unit I of input layer.

$E_i = X_{ios}(1-X_{ios})\Sigma_j(E_{j*}W_{jhl})$, (this is an error term corresponding to neuron-like unit i of input layer over all j units).

The training process consists of entering new (or the same) exemplar data into neural network 300 and observing the output signal with respect to a known empirical output signal. If the output is in error with what the known empirical output signal should be, the weights are adjusted in the manner described above. This iterative process is repeated until the output signals are substantially in accordance with the desired (empirical) output signal, then the weight of the modulators are fixed.

Upon fixing the weights of the modulators, predetermined face-space memory indicative of recognition and non-recognition are established. The neural network is then trained and can make generalizations about human facial image input data by projecting said input data into face-space memory which most closely corresponds to that data.

The description provided for neural network 300 as utilized in the present invention is but one technique by which a neural network algorithm can be employed. It will be readily apparent to those who are of ordinary skill in the art that numerous neural network model types including multiple (sub-optimized) networks as well as numerous training techniques can be employed to obtain equivalent results to the method as described herein above.

Referring now particularly to FIG. 4, and according to a second preferred embodiment of the present invention, a principal component analysis (PCA) may be implemented as the system's face recognition element 130. The PCA facial image recognition/verification element generally referred to by the numeral 400, includes a set of training images 481 which consists of a plurality of digitized human facial image data 171 representative of a cross section of the population of human faces. In order to utilize PCA in facial image recognition/verification a Karhunen-Loève Transform (KLT), readily known to those of ordinary skill in the art, can be employed to transform the set of training images 481 into an orthogonal set of basis vectors or eigenvectors. In the present invention, a subset of these eigenvectors, called eigenfaces, comprise an orthogonal coordinate system, detailed further herein, and referred to as face-space.

The implementation of the KLT is as follows: An average facial image 482, representative of an average combination of each of the training images 481 is first generated. Next, each of the training images 481 are subtracted from the average face 482 and arranged in a two dimensional matrix 483 wherein one dimension is representative of each pixel in the training images, and the other dimension is representative of each of the individual training images. Next, the transposition of matrix 483 is multiplied by matrix 483 generating a new matrix 484. Eigenvalues and eigenvectors 485 are thenceforth calculated from the new matrix 484 using any number of standard mathematical techniques that will be well known by those of ordinary skill in the art such as Jacobi's method. Next, the eigenvalues and eigenvectors 485 are sorted 486 from largest to smallest whereupon the set is truncated to only the first several eigenvectors 487 (e.g. between 5 and 20 for acceptable performance). Lastly, the truncated eigenvalues and eigenvectors 487 are provided as outputs 488. The eigenvalues and eigenvectors 488 and average face 482 can then be stored inside the ROM memory 114 in the computer 113 for use in recognizing or verifying facial images.

Figure 5:
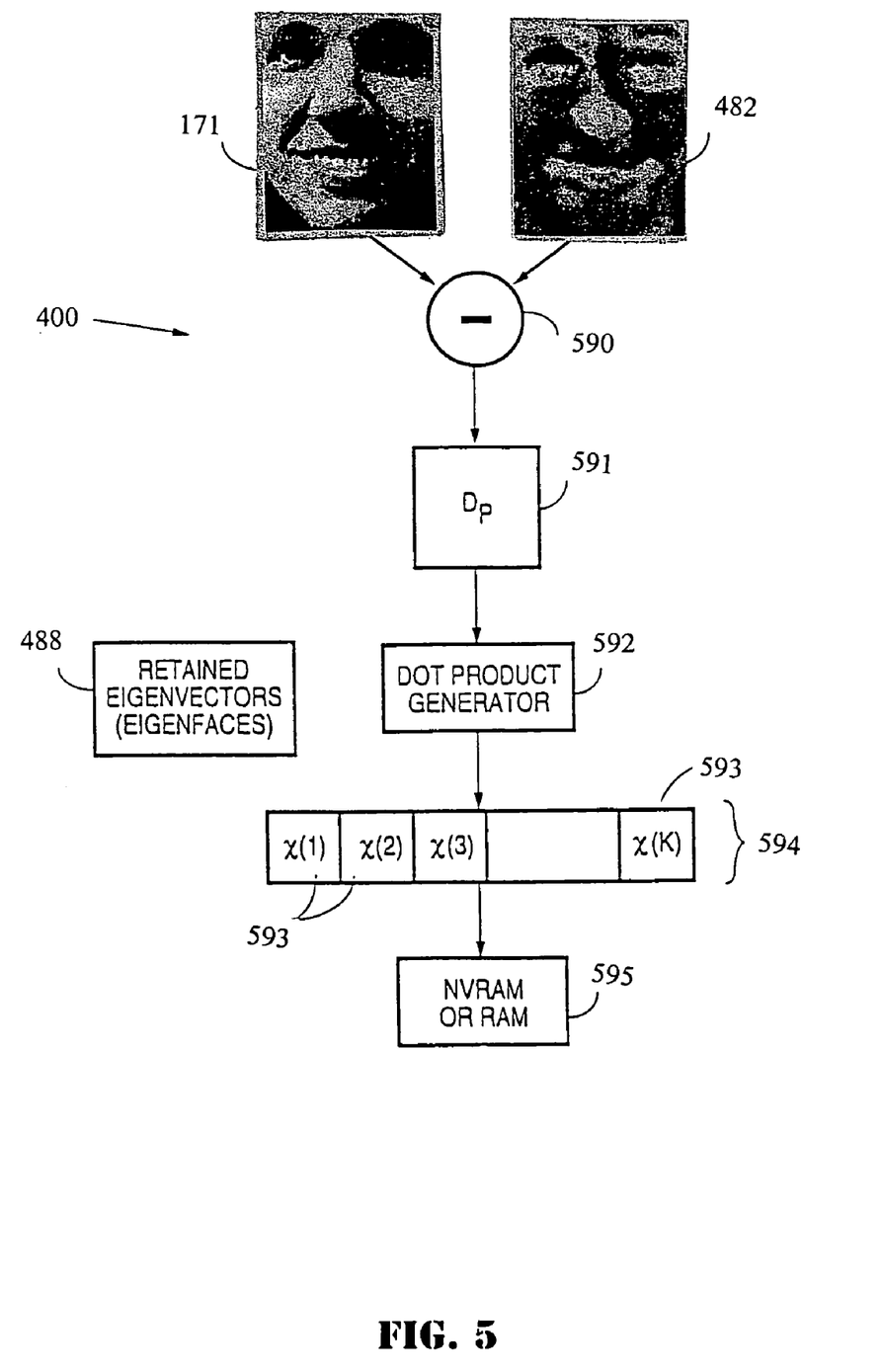
FIG. 5 shows a representation of a human facial image transformation of the present invention.

Referring now to FIG. 5, for the PCA algorithm 400 facial image recognition/identification is accomplished by first finding and converting a human facial image to a small series of coefficients which represent coordinates in a face-space that are defined by the orthogonal eigenvectors 488. Initially a preprocessing step, defined further herein below, is employed to locate, align and condition the digital video images. Facial images are then projected as a point in face-space. Verification of a human user 140 is provided by measuring the Euclidean distance between two such points in face-space. Thus, if the coefficients generated as further described below represent points in face-space that are within a predetermined acceptance distance, a signal indicative of recognition is generated. If, on the other hand, the two points are far apart, a signal indicative on non-recognition is generated. Although this method is given as a specific example of how the PCA 400 algorithm works, the mathematical description and function of the algorithm is equivalent to that of the neural network 300 algorithm. The projection of the faces into face-space is accomplished by the individual neurons and hence the above description accurately relates an analogous way of describing the operation of neural network 300.

Again using the PCA 400 algorithm as an example, a set of coefficients for any given human facial image is produced by taking the digitized human facial image 171 of a human user 140 and subtracting 590 the average face 482. Next, the dot product 591 between the difference image and one eigenvector 488 is computed by dot product generator 592. The result of the dot product with a single eigenface is a numerical value 593 representative of a single coefficient for the image 171. This process is repeated for each of the set of eigenvectors 488 producing a corresponding set of coefficients 594 which can then be stored 595 in the non-volatile RAM memory operably associated with smart-card 127 described herein above. Because there are a relatively few coefficients necessary to represent a set of reference faces of a single human user 140, the storage space requirements for the non-volatile RAM memory of smart-card 127 are minimal and on the order of 100 bytes per stored encoded facial image.

As further described below, said first human facial images of a human user 140 are stored in non-volatile RAM memory of smart-card 127 during the training process. Each time the facial image of human user 140 is acquired by the video camera 111 (which is embedded in smart-card 127) thereafter, a said second human facial image of said human user 140 is acquired, the facial image is located, aligned, processed and compared to said first human facial image by PCA 400 or neural network 300. Thus, the technique as described above provides the means by which two said facial image sets can be accurately compared and a recognition signal can be generated therefrom.

The preferred method of acquiring and storing the aforesaid facial images/expressions of said human user 140, begins with the human user 140, providing multiple facial images of him/herself to be utilized as templates for all subsequent recognition and identification. To accomplish this, a security system administrator instructs computer 113 to enter a "learning" mode whereupon computer 113 gathers specific information about the human user 140 such as data which is normally acquired and stored on smart-cards, and prepares to gather facial images of human user 140. The computer 113 acquires several digitized first human facial images of the human user 140 through the use of CCD video camera 111 and digitizer 112. These first human facial images are preprocessed, the highest quality images selected and thenceforth reduced to coefficients and stored in the non-volatile RAM memory of smart-card 127. These selected fist human facial images will be utilized thereafter as the reference faces. When a human user 140 places smart-card 127 into the docking station 118 thus connecting and communicating with the computer 113 and initiating a biometric verification sequence, the human user 140 trigger's motion detection and face finding algorithms embedded in the facial image recognition software engine 130. At this time, video camera 111 begins acquiring second human facial images of the human user 140 and converts said second human facial images to digital data via digitizer 112. The digitized second human facial images obtained thereafter are stored in the RAM memory 114 of computer 113 as comparison faces.

Once the said second human facial image(s) has been stored in the computer 113, the facial recognition element 130, either neural network 300 or PCA 400 can be employed to perform a comparison between said stored first human facial image and said acquired second human facial image and produce an output signal in response thereto indicative of recognition or non-recognition of the human user 140. The output signal is therewith provided to the interface electronics 132 via communications cable 131. Interface electronics 132 is responsible for interfacing the computer 113 with the facility lock control mechanisms 133, point of sale terminal 234 or Internet-based financial transaction authenticator 235 and to enable the transfer of signals thereto.

In the event the said second human facial image of human user 140 is recognized, the operational software resident in computer 113 can provide the necessary signals to enable access to a secure facility or enable a point of sale or Internet-based financial transaction. In the event the said second human facial image of human user 140 is not recognized, the operational software resident in computer 113 can prevent human user 140 from gaining access to the secure facility or prevent the completion of an aforementioned financial transaction.

Figure 6:
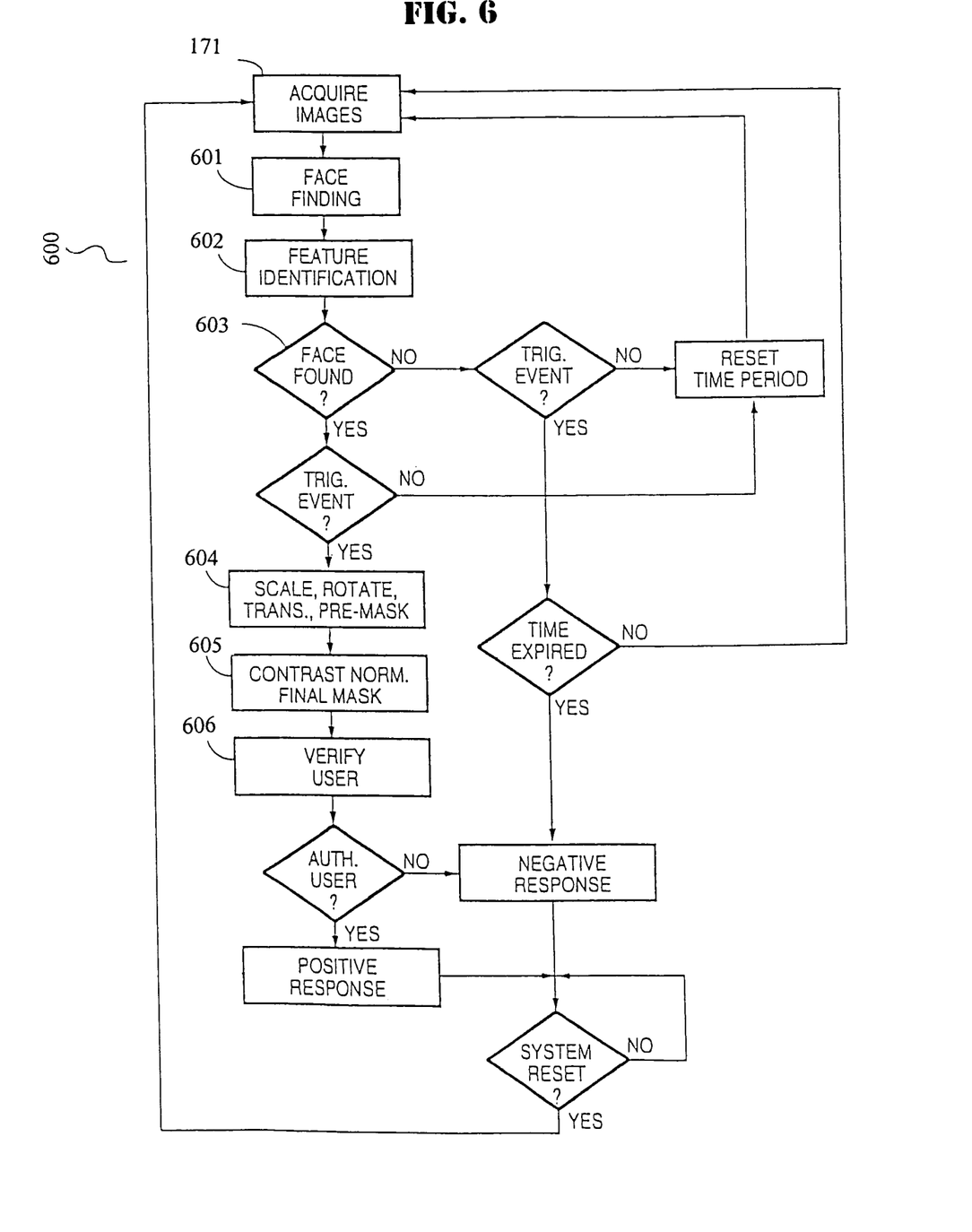
FIG. 6 shows exemplar steps utilized by the face recognition software engine in preprocessing facial image data prior to recognition/identification.

As previously stated herein above, and referring now to FIG. 6, a preprocessing function 600 must typically be implemented in order to achieve efficient and accurate processing by the chosen face recognition element 130 of acquired human facial image data 171. Whether utilizing a neural network 300, PCA 400 or another equivalent face recognition software algorithm, the preprocessing function generally comprises elements adapted for (1) face finding 601, (2) feature extraction 602, (3) determination of the existence within the acquired data of a human facial image 603, (4) scaling, rotation, translation and pre-masking of the captured human image data 604, and (5) contrast normalization and final masking 605. Although each of these preprocessing function elements 601, 602, 603, 604, 605 is described in detail further herein, those of ordinary skill in the art will recognize that some or all of these elements may be dispensed with depending upon the complexity of the chosen implementation of the face recognition element 130 and desired overall system attributes.

In the initial preprocessing step of face finding 601, objects exhibiting the general character of a human facial image are located within the acquired image data 171 where after the general location of any such existing object is tracked. Although those of ordinary skill in the art will recognize equivalent alternatives, three exemplary face finding techniques are (1) baseline subtraction and trajectory tracking, (2) facial template subtraction, or the lowest error method, and (3) facial template cross-correlation.

In baseline subtraction and trajectory tracking, a first, or baseline, acquired image is generally subtracted, pixel value-by-pixel value, from a second, later acquired image. As will be apparent to those of ordinary skill in the art, the resulting difference image will be a zero-value image if there exists no change in the second acquired image with respect to the first acquired image. However, if the second acquired image has changed with respect to the first acquired image, the resulting difference image will contain nonzero values for each pixel location in which change has occurred. Assuming that a human user 140 will generally be non-stationary with respect to the system's camera 111, and will generally exhibit greater movement than any background object, the baseline subtraction technique then tracks the trajectory of the location of a subset of the pixels of the acquired image representative of the greatest changes. During initial preprocessing 601, 602, this trajectory is deemed to be the location of a likely human facial image.

In facial template subtraction, or the lowest error method, a ubiquitous facial image, i.e. having only nondescript facial features, is used to locate a likely human facial image within the acquired image data. Although other techniques are available, such a ubiquitous facial image may be generated as a very average facial image by summing a large number of facial images. According to the preferred method, the ubiquitous image is subtracted from every predetermined region of the acquired image, generating a series of difference images. As will be apparent to those of ordinary skill in the art, the lowest error in difference will generally occur when the ubiquitous image is subtracted from a region of acquired image data containing a similarly featured human facial image. The location of the region exhibiting the lowest error, deemed during initial preprocessing 601, 602 to be the location of a likely human facial image, may then be tracked.

In facial template cross-correlation, a ubiquitous image is cross-correlated with the acquired image to find the location of a likely human facial image in the acquired image. As is well known to those of ordinary skill in the art, the cross-correlation function is generally easier to conduct by transforming the images to the frequency domain, multiplying the transformed images, and then taking the inverse transform of the product. A two-dimensional Fast Fourier Transform (2D-FFT), implemented according to any of myriad well known digital signal processing techniques, is therefore utilized in the preferred embodiment to first transform both the ubiquitous image and acquired image to the frequency domain. The transformed images are then multiplied together. Finally, the resulting product image is transformed, with an inverse FFT, back to the time domain as the cross-correlation of the ubiquitous image and acquired image. As is known to those of ordinary skill in the art, an impulsive area, or spike, will appear in the cross-correlation in the area of greatest correspondence between the ubiquitous image and acquired image. This spike, deemed to be the location of a likely human facial image, is then tracked during initial preprocessing 601, 602.

Once the location of a likely human facial image is known, feature identification 602 is employed to determine the general characteristics of the thought-to-be human facial image for making a threshold verification that the acquired image data contains a human facial image and in preparation for image normalization. Feature identification preferably makes use of eigenfeatures, generated according to the same techniques previously detailed for generating eigenfaces, to locate and identify human facial features such as the eyes, nose and mouth. The relative locations of these features are then evaluated with respect to empirical knowledge of the human face, allowing determination of the general characteristics of the thought-to-be human facial image as will be understood further herein. As will be recognized by those of ordinary skill in the art, templates may also be utilized to locate and identify human facial features according to the time and frequency domain techniques described for face finding 601.

Once the initial preprocessing function elements 601, 602 have been accomplished, the system is then prepared to make an evaluation 603 as to whether there exists a facial image within the acquired data, i.e. whether a human user 140 is within the field of view of the system's camera 111. According to the preferred method, the image data is either accepted or rejected based upon a comparison of the identified feature locations with empirical knowledge of the human face. For example, it is to be generally expected that two eyes will be found generally above a nose, which is generally above a mouth. It is also expected that the distance between the eyes should fall within some range of proportion to the distance between the nose and mouth or eyes and mouth or the like. Thresholds are established within which the location or proportion data must fall in order for the system to accept the acquired image data as containing a human facial image. If the location and proportion data falls within the thresholds, preprocessing continue. If, however, the data falls without the thresholds, the acquired image is discarded.

Threshold limits may also be established for the size and orientation of the acquired human facial image in order to discard those images likely to generate erroneous recognition results due to poor presentation of the user 140 to the system's camera 111. Such errors are likely to occur due to excessive permutation, resulting in overall loss of identifying characteristics, of the acquired image in the morphological processing 604, 605 required to normalize the human facial image data, as detailed further herein. Applicant has found that it is simply better to discard borderline image data and acquire a new better image. For example, the system 10 may determine that the image acquired from a user 140 looking only partially at the camera 111, with head sharply tilted and at a large distance from the camera 111, should be discarded in favor of attempting to acquire a better image, i.e. one which will require less permutation 604, 605 to normalize. Those of ordinary skill in the art will recognize nearly unlimited possibility in establishing the required threshold values and their combination in the decision making process. The final implementation will be largely dependent upon empirical observations and overall system implementation.

Although the threshold determination element 603 is generally required for ensuring the acquisition of a valid human facial image prior to subsequent preprocessing 604, 605 and eventual attempts by the face recognition element 130 to verify 606 the recognition status of a user 140, it is noted that the determinations made may also serve to indicate a triggering event condition. As previously stated, one of the possible triggering event conditions associated with the apparatus is the movement of a user 140 within the field of view of the system's camera 111. Accordingly, much computational power may be conserved by determining the existence 603 of a human facial image as a preprocessing function—continuously conducted as a background process. Once verified as a human facial image, the location of the image within the field of view of the camera 111 may then be relatively easily monitored by the tracking functions detailed for face finding 601. The system 10 may thus be greatly simplified by making the logical inference that an identified known user 140 who has not moved out of sight, but who has moved, is the same user 140.

After the system 10 determines the existence of human facial image data, and upon triggering of a recognition event, the human facial image data is scaled, rotated, translated and pre-masked 604, as necessary. Applicant has found that the various face recognition elements 130 perform with maximum efficiency and accuracy if presented with uniform data sets. Accordingly, the captured image is scaled to present to the face recognition element 130 a human facial image of substantially uniform size, largely independent of the user's distance from the camera 111. The captured image is then rotated to present the image in a substantially uniform orientation, largely independent of the user's orientation with respect to the camera 111. Finally, the captured image is translated to position the image preferably into the center of the acquired data set in preparation for masking, as will be detailed further herein. Those of ordinary skill in the art will recognize that scaling, rotation and translation are very common and well-known morphological image processing functions that may be conducted by any number of well known methods. Once the captured image has been scaled, rotated and translated, as necessary, it will reside within a generally known subset of pixels of acquired image data. With this knowledge, the captured image is then readily pre-masked to eliminate the background viewed by the camera 111 in acquiring the human facial image. With the background eliminated, and the human facial image normalized, much of the potential error can be eliminated in contrast normalization 605, detailed further herein, and eventual recognition 606 by the face recognition element 130.

Because it is to be expected that the present invention 10 will be placed into service in widely varying lighting environments, the preferred embodiment includes the provision of a contrast normalization 605 function for eliminating adverse consequences concomitant the expected variances in user illumination. Although those of ordinary skill in the art will recognize many alternatives, the preferred embodiment of the present invention 10 comprises a histogram specification function for contrast normalization. According to this method, a histogram of the intensity and/or color levels associated with each pixel of the image being processed is first generated. The histogram is then transformed, according to methods well known to those of ordinary skill in the art, to occupy a predetermined shape. Finally, the image being processed is recreated with the newly obtained intensity and/or color levels substituted pixel-by-pixel. As will be apparent to those of ordinary skill in the art, such contrast normalization 605 allows the use of a video camera 111 having very wide dynamic range in combination with a video digitizer 112 having very fine precision while arriving at an image to be verified having only a manageable number of possible intensity and/or pixel values. Finally, because the contrast normalization 605 may reintroduce background to the image, it is preferred that a final masking 605 of the image be performed prior to facial image recognition 606. After final masking, the image is ready for recognition 606 as described herein above.

The above described embodiments are set forth by way of example and are not for the purpose of limiting the claims of the present invention. It will be readily apparent to those or ordinary skill in the art that obvious modifications, derivations and variations can be made to the embodiments without departing from the scope of the invention. For example, the facial image recognition element described above as either a neural network or PCA could also be one of a statistical based system, template or pattern matching, or even rudimentary feature matching whereby the features of the face (e.g. eye, nose and mouth locations) are analyzed. Accordingly, the claims appended hereto should be read in their full scope including any such modifications, derivations and variations.

What is claimed is:

1. A non-invasive human user identification and verification system, comprising:
    a portable smart card;
    a silicon-based video camera embedded within said smart card for gathering facial image data;
    a digitizer integrated within said smart card for digitizing said facial image data;
    non-volatile storage media for receiving and storing said digitized facial image data;
    a smart-card docking station with a port for receiving said smart card and communicating said digitized image data therethrough; and
    a communications interface for transmitting said stored digitized facial image data from said docking station to a central processor that is housed in a physical structure separate from said smart card, said central processor being capable of receiving and manipulating said data to produce an output signal for use in the identification and verification of said human user.

2. A method for the identification and verification of a human user, comprising the steps of:
    capturing one or more first facial images at a remote enrollment station and digitizing said first facial images for storage in a non-volatile media within a portable smart card;
    inserting said smart card with embedded video camera into a docking port; and
    capturing one or more second facial images and digitizing and transmitting said second facial images from the smart card inserted in said docking port to a central processor that is housed in a physical structure separate from said smart card, said central processor being capable of receiving and comparing said first and second facial images and producing a signal indicative of recognition or non-recognition of said human user.

3. A human user identification and verification system, comprising:
    a portable personal identification device;
    a communications port adapted to receive information from the personal identification device, the communications port being external to the personal identification device;
    wherein the personal identification device comprises:
        a prerecorded representation of biometric data identifying an individual;
        a sensor configured to capture biometric data; and
        a communications interface configured to transmit information to the communications port, the information including both the prerecorded representation of biometric data identifying the individual and the biometric data captured by the sensor; and
    a processor communicatively coupled to the communications port and housed in a physical structure separate from said personal identification device, the processor being configured to process the information transmitted from the personal identification device to the communications port and produce a signal indicative of whether the biometric data captured by the sensor matches the individual identified by the prerecorded representation of biometric data.

4. The human user identification and verification system of claim 3, wherein the personal identification device is a smart card.

5. The human user identification and verification system of claim 4, wherein the communications port is a docking station.

6. The human identification and verification system of claim 4, wherein the biometric data identifying the individual comprises facial image data and wherein the sensor is an image-capturing device.

7. The human identification and verification system of claim 5, wherein the docking station and sensor on the smart card are positioned to facilitate a good quality facial image capture of a user during routine insertions of the smart card into the docking station.

8. The human identification and verification system of claim 3, wherein the biometric data identifying the individual comprises facial image data and wherein the sensor is an image-capturing device.

9. The human identification and verification system of claim 8, wherein the personal identification device further comprises machine-readable storage media for storing the prerecorded representation of biometric data identifying an individual.

10. The human identification and verification system of claim 9, wherein the storage media comprises non-volatile memory.

11. The human identification and verification system of claim 3, wherein said prerecorded representation of biometric data identifying an individual comprises a plurality of facial images of the individual.

12. The human identification and verification system of claim 11, wherein the personal identification device is configured to automatically remove underutilized prerecorded representations of facial images.

13. The human identification and verification system of claim 3, wherein the personal identification device is configured to acquire and store data representing a plurality of biometric characteristics of a person.

14. The human identification and verification system of claim 3, wherein the sensor is an image-capturing device operable to capture at least two facial images of the individual, and wherein the processor is configured to compare the two facial images to detect motion.

* * * * *